Dec. 29, 1964   C. W. CHRISTMAN   3,162,942
PROCESS AND APPARATUS FOR PRODUCING CELLULAR MATERIAL
Filed June 27, 1960   3 Sheets-Sheet 1
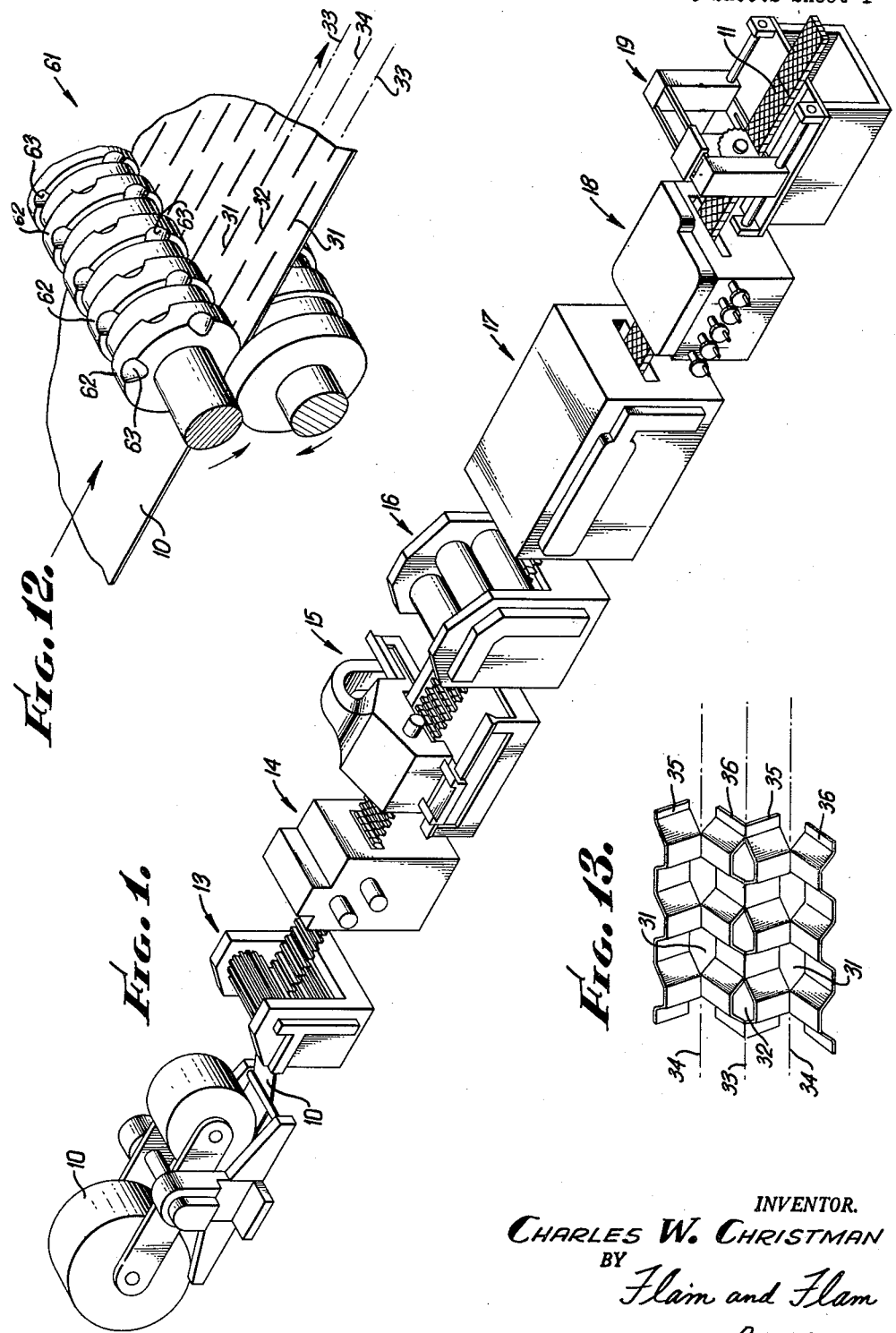
INVENTOR.
CHARLES W. CHRISTMAN
BY
Flam and Flam
ATTORNEYS.

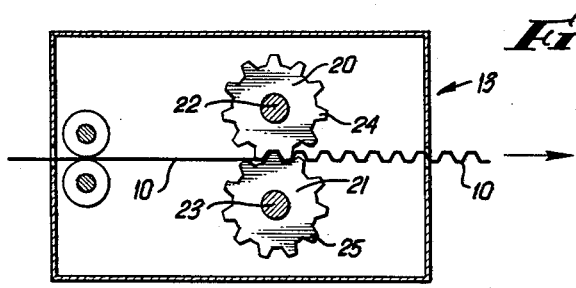
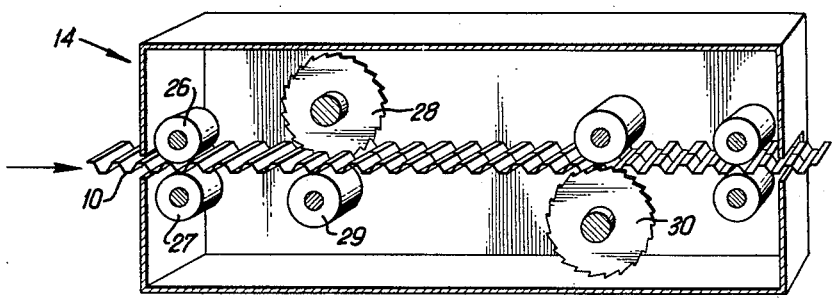
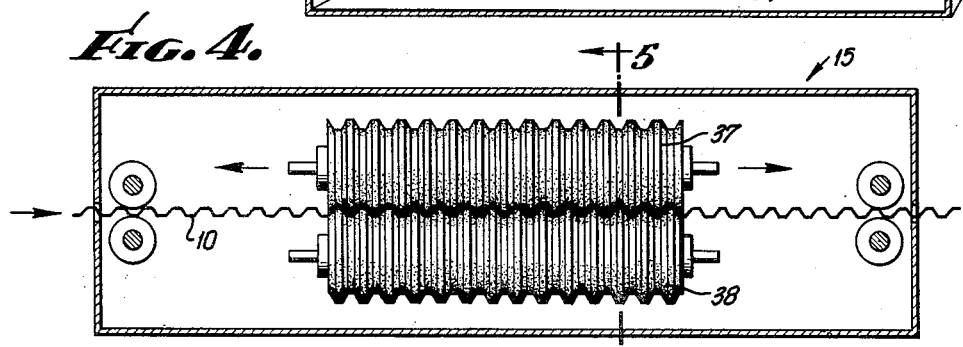
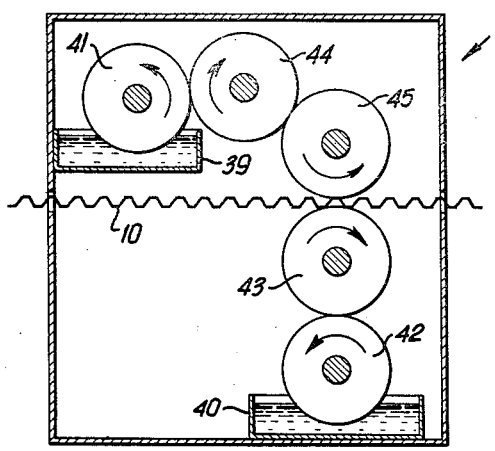
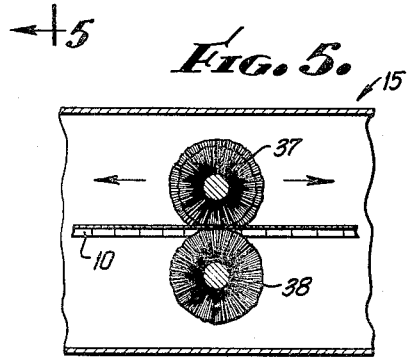

Dec. 29, 1964   C. W. CHRISTMAN   3,162,942
PROCESS AND APPARATUS FOR PRODUCING CELLULAR MATERIAL
Filed June 27, 1960   3 Sheets-Sheet 3
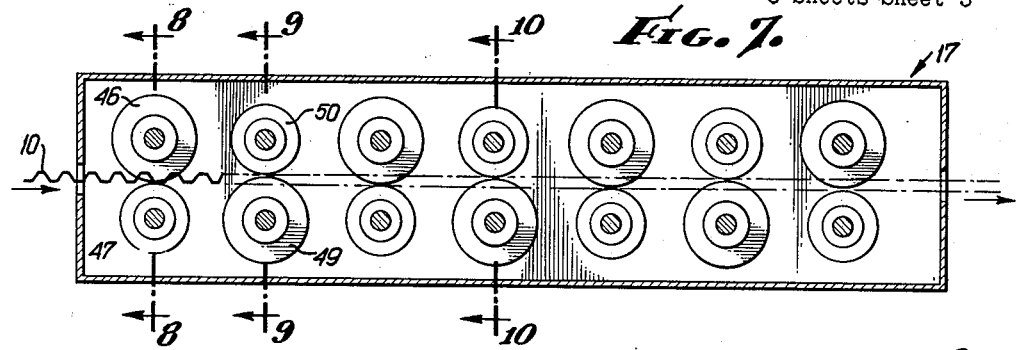
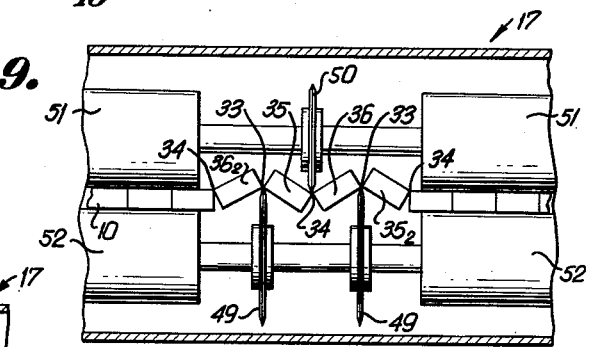
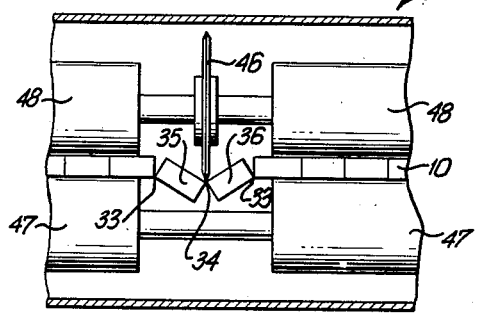
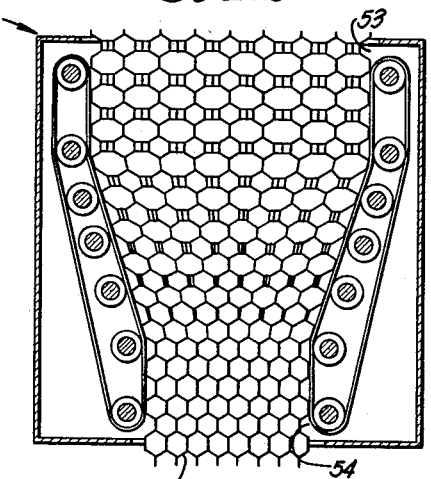
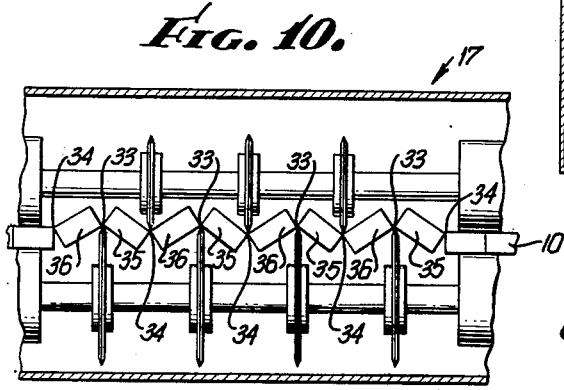
INVENTOR.
CHARLES W. CHRISTMAN
BY
Flam and Flam
ATTORNEYS.

United States Patent Office 3,162,942
Patented Dec. 29, 1964

3,162,942
PROCESS AND APPARATUS FOR PRODUCING CELLULAR MATERIAL
Charles W. Christman, Los Angeles, Calif., assignor to Formacel, Inc., Los Angeles, Calif., a corporation of California
Filed June 27, 1960, Ser. No. 39,110
8 Claims. (Cl. 29—455)

This invention relates to a cell core structure and particularly to the method of making it.

Cell core structures have in the past been formed by transversely folding in accordion fashion, longitudinally fluted material. Before the material is folded, transverse cuts provide axes of folding. Thus, in my prior application, Serial No. 655,760 filed April 29, 1957, now Patent No. 2,933,122 issued April 19, 1960, there is disclosed and claimed a continuous step process for forming cell material in this fashion in which material is fluted longitudinally and in the direction of progress of the process. The dimension along the transverse lines of bending is limited whereas the longitudinal dimension is virtually limitless. For structural or other reasons, the converse may be desirable.

Accordingly, an object of this invention is to provide a uniformly continuous process whereby cellular material can be formed and in which the dimension of the material along the fold lines is virtually without limit. To accomplish this function, the material progresses in a direction transversely of the channels or flutes. The cuts in the material can thus be formed without stopping the material. Also, the dimension of the material transverse to the flutes or channels is virtually limitless.

In this organization, the accordion folds must progress longitudinally so that the material is laterally squeezed together. An object of this invention is to provide a process and apparatus for expeditiously accomplishing this function.

Another object of this invention is to provide a process for making cellular material in which toothed slitter wheels are expeditiously used in a uniformly continuous process for providing the necessary cuts extending transverse to the fluted material.

This invention prosesses many other advantages and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a pictorial view illustrating diagrammatically several serially arrayed machines useful in a continuous process for forming cellular material;

FIG. 2 is a diagrammatic view illustrating the forming machine for providing the fluted or channeled configuration;

FIG. 3 is a diagrammatic view illustrating the slotting machine for providing the necessary transverse cuts;

FIG. 4 diagrammatically illustrates the machine for removing burrs created by the slotting operation;

FIG. 5 is a sectional view taken along a plane indicated by line 5—5 of FIG. 4, and similarly diagrammatic in form;

FIG. 6 diagrammatically illustrates the machine for applying bonding fluid to the transversely fluted material;

FIG. 7 diagrammatically indicates the longitudinal progress of the material through the bending machine;

FIGS. 8, 9 and 10 illustrate diagrammatically, and along sections indicated by lines 8—8, 9—9 and 10—10 of FIG. 7, the operation of the individual bending dies;

FIG. 11 is a view diagrammatically illustrating the folding or squeezing machine for completing the accordion folding;

FIG. 12 illustrates diagrammatically a machine including slitters in place of the rotary cutters of FIG. 3, but located in advance of the forming machine; and FIG. 13 illustrates pictorially the material as it enters the squeezing unit.

In FIG. 1 there is illustrated material at a stock roll 10 that is intended to be cellularly formed. The material may be an aluminum alloy, stainless steel or any other material. The cellular material 11 appears at the lower right hand portion of FIG. 1.

The material passes through several serially arrayed machines that perform various functions as the material continuously passes therethrough.

In the present form the material passes first into a forming machine 13. This machine forms flutes or channels that extend transverse to the direction of progress of the material. The machines will be generally identified before each is discussed in detail.

The material then passes to a cutting machine 14 that provides cuts in the crests and troughs in a laterally spaced relationship corresponding to the desired crest height. (See FIG. 13.) The next machine 15 (FIG. 1) removes the burrs formed by cutting machine 14. The next machine 16 applies a bonding fluid to the outer surfaces of the crests and troughs so that adjacent crest sections and adjacent trough sections (FIG. 13) become integrated upon completion of the folds.

The next machine 17 (FIG. 1) bends the material along lines parallel to the cuts to initiate the folding of the material. The next machine 18 squeezes the bent material so that the crests and troughs respectively on opposite sides of the fold lines are placed in back to back relationship. The accordion folding is thus completed and a cellular structure is formed. The last machine 19 cuts the cellular material when the desired length is formed.

In FIG. 2, the operative parts of the forming machine are illustrated. Forming rollers 20 and 21 are supported on transverse axes 22 and 23. The rollers 20 and 21 have longitudinally extending interdigitating teeth 24 and 25. The material 10 is fed between the rollers 20 and 21, and the teeth of the forming rollers thus provide a transversely fluted configuration. A hexagon, diamond, sinuous, or other final cell configuration (FIG. 13) is determined by the shape of the teeth 24 and 25.

The transversely fluted material 10, after it leaves the forming machine 13, next enters the slotting machine 14. Here the material first enters between a pair of guide rollers 26 and 27 located on opposite sides of the material in suitably spaced relationship. The fluted material 10 then passes beneath a series of rotary cutters 28. The cutters 28 must clear the flat troughs, cutting the crests and sides of the channels. A supporting roller 29 beneath the material 10 holds it in engagement with the cutters 28. The cutters 28 provide slits 31 through the crests of the material at uniformly spaced intervals therealong and corresponding to twice the cell height (see FIG. 13).

The material 10 slotted by the cutters 28 then passes above a series of rotary cutters 30 similar to the cutters 28. The cutters 30 are located in staggered relationship to the cutters 28, and provide slits 32 through the troughs of the material in uniformly spaced relationship. The cutters 30 just clear the flat crests, cutting not only the troughs but also the sides of the channels. As shown in FIG. 13 the uncut troughs and crests adjoining the cuts may be bent so that the adjacent crest sections and adjacent trough sections may be placed in back to back relationship. Lines 33, 34, 33, 34, etc. coincident respectively with the uncut troughs and crests form transverse bending axes. When the accordion fold is completed by 90° opposite rotation of the consecutive fluted sections 35, 36, 35, the cellular material is formed. It may be noted that the fluted sections 35, 36, 35, etc. extend endlessly in a direction corresponding to the progress of the material.

In the present example, the accordion folding is initiated by the folding machine 17, but only after a deburring and application of bonding material to the crests and troughs.

The deburring unit 15, illustrated in FIGS. 4 and 5, incorporates suitable deburring roller-like members 37 and 38. The members may constitute wire brushes rotating at high speed. These deburring members have axes paralleling the direction of travel of the material 10. However, they are capable of movement both axially and transversely whereby the burrs created by the cutting or slotting unit 14 are removed.

FIG. 6 illustrates the bond applicator machine 16. There are two reservoir tanks 39 and 40 into which pump rollers 41 and 42 partially extend. The pump rollers 41 and 42 lift the bonding material to transfer rollers as at 43 for the crests on the lower side and as at 44 and 45 for the troughs on the upper side.

The folding machine 17 must fold the material progressively along lines 34, 33, 34, etc. because these lines extend in the direction of travel of the material. To accomplish this, bends are initiated in longitudinally staggered relationship to allow for the lateral movement of the material at each stage.

First of all, a thin rotary forming disk 46 (FIG. 8) engages along the crest line or axis 34 at the center of the material, but below the general plane of the crests. The two adjoining fluted sections 35 and 36 are forced downwardly while the laterally adjacent fluted sections are held against bending. When forced downwardly by the forming disk 46, the sections 35 and 36 bend about trough axes 33 as shown, as well as about the axis 34 along which the disk 46 engages.

For supporting the adjacent fluted sections, two coaxial lower rollers 47 and two coaxial upper rollers 48 are provided. The rollers 47 engage along the troughs of the material. The rollers 48 engage along the crests of the material and conveniently are supported on the same shaft as the forming disk 46. The rollers extend laterally outwardly from places spaced beyond the trough axes 33 about which bending takes place.

The forming disk 46 is so located that the line 34 is moved beyond the general plane of the troughs in which the lines or axes 33 lie. This means that a subsequent lateral squeezing operation will automatically complete the accordion folding by virtue of the over center relationship.

After the material passes beyond the forming disk 46, and the supporting rollers 47 and 48, a pair of forming disks 49 beneath the material (FIG. 9) and rollers 51 and 52 are provided for causing the second pair of fluted sections $35_2$ and $36_2$ to bend upwardly. The disks 49 engage along trough axes 33 at which bending took place at the previous stage.

Bending now takes place along axes 34 outwardly adjoining the sections $35_2$ and $36_2$. The supporting rollers 51 and 52 extend laterally from points beyond these bending axes.

The forming disks 49 are located above the general plane of the crests, and hence cause the sections $35_2$ and $36_2$ to bend in over center fashion about axes 34. A disk 59 above the material and engaging along the line or axis 34 supports the material between the forming disks 49.

FIG. 10 illustrates a still further stage of bending by forming disks. As many stages are provided as there are pairs of fluted sections 35 and 36. At the end of the machine 17, all of the sections 35 and 36 are bent in over center relationship.

After the material passes from the bending machine 17, it is squeezed together whereby the accordion folding is completed and a cellular structure formed. This is accomplished by the squeezing unit 18 shown in FIG. 11. The squeezing unit 18 provides a passage or channel through which the material progresses. The inlet end 53 of the passage has a width corresponding to the dimension of the material as it leaves the bending unit 17. But the width at the other end 54 is reduced to a point corresponding to the cell dimension multiplied by the number of cells.

Thus the accordion folding is completed and the crests and troughs of adjacent fluted sections are caused firmly to contact each other. The bonding material applied to these faces holds the cells together.

Skin covering material (not shown) may be applied continuously to the material as it exits the squeezing unit 18, and as suggested, for example, in my prior application.

In the form illustrated in FIG. 12, a slitting machine 61 is provided in place of the slotting machine 14 and the deburring unit 15. In addition, the slitting machine is placed ahead of the forming machine 13. The slitting unit incorporates a series of upper and lower slitting disks 62. Each of the upper disks have edges relieved as at 63 at appropriate intervals so that the longitudinally interrupted slits 31 and 32 are formed along the axes 33 and 34. The relieved portions 63 correspond to the uncut crests and troughs.

The disks 62 provide staggered sets of cuts. The staggered relationship is achieved by having the relieved portions 63 at opposite edges of the disks equiangularly spaced and in angularly staggered relationship with respect to each other. The relieved portions at corresponding edges of the disks are aligned.

The slitters or disks characteristically leave no burrs. Hence, a simple process is provided.

The inventor claims:

1. The continuous process of manufacturing cellular cored material, which comprises: advancing flat stock material; progressively cutting longitudinally spaced sets of slits in the material so that the slits of successive sets are transversely staggered; progressively forming the material into fluted or channeled configuration to provide crests and troughs extending across the material; correlating the slitting and forming so that alternate sets of slits extend across the troughs and the other alternate sets of slits extend across the crests thereby forming corresponding sets of longitudinally extending bending axes along the crests and troughs respectively; progressively deflecting one set of longitudinally extending bending axes relative to the other set of longitudinally extending bending axes so that the material assumes a transversely sinuous form; and then progressively squeezing the material in a lateral direction to complete an accordion folding thereof.

2. The process as set forth in claim 1 in which the slitting of the material is accomplished by the use of rotary slitters cutting through the material prior to its being fluted or channeled.

3. The process as set forth in claim 1 in which the slitting of the material is accomplished by the use of two sets of rotary cutters located on opposite sides of the material and cutting across the crests and troughs respectively.

4. The continuous process of manufacturing cellular cored material, which comprises: advancing flat stock material; progressively providing longitudinally spaced sets of slits in the material so that the slits of successive sets are transversely staggered; progressively forming the material into fluted or channeled configuration to provide crests and troughs extending across the material; correlating the slitting and forming so that alternate sets of slits extend across the troughs and the other alternate sets of slits extend across the crests thereby forming longitudinally extending bending axes along the crests and troughs respectively; progressively applying bonding material to the outer surfaces of the crests and troughs; progressively bending the material to transversely sinuous form so that the trough axes and the crest axes are transposed; and progressively squeezing the material in a lateral direction to complete an accordion folding thereof and to place pairs of adjacent sections of the crests and pairs of adjacent sections of troughs into contact with each other.

5. In apparatus for producing cellular core material: means for continuously advancing flat stock material; forming rolls between which the material progresses for providing transversely fluted or channeled configuration; said forming rollers providing crests and troughs; means progressively engaging the stock material and providing the crests and troughs with relatively staggered sets of slits dividing the material transversely into longitudinally aligned sections, there being two sets of bending axes along the troughs and crests respectively at which the adjacent sections are articulated; longitudinally staggered bending means for successive section sets respectively, for progressively folding the corresponding sections to an extent such that the sets of axes are transposed on opposite sides of the material; and means for progressively squeezing the material in a transverse direction to complete the accordion fold.

6. In apparatus for producing cellular core material: means for continuously advancing flat stock material; forming rollers between which the material passes for providing a transversely fluted or channeled configuration; said forming rollers providing crests and troughs; means providing the crests and troughs with relatively staggered sets of slits dividing the material transversely into longitudinally aligned sections, there being two sets of bending axes along the troughs and crests respectively at which the adjacent sections are articulated; longitudinally staggered bending means for successive section sets respectively, for progressively folding the corresponding sections to an extent such that the sets of axes are transposed on opposite sides of the material; and means progressively squeezing the material in a transverse direction whereby an accordion folding is completed.

7. In apparatus for continuously producing cellular cored material: means for continuously advancing flat stock material; forming means progressively engaging the material for providing a transversely fluted or channeled configuration in the material defining crests and troughs; cutting means progressively engaging the material and providing the crests and troughs with relatively staggered sets of slits and dividing the material transversely into longitudinally aligned sections, there being two sets of bending axes along the crests and troughs respectively about which adjacent sections may be angularly moved; bending means for progressively accordion folding the sections about the said bending axes and means for progressively squeezing the material in a transverse direction to complete the accordion fold.

8. In apparatus for continuously producing cellular cored material: means for continuously advancing flat stock material; means cutting longitudinally spaced sets of slits in the material so that the slits of successive sets are transversely staggered; means synchronized with the cutting means for forming the material into fluted or channeled configuration to provide crests and troughs extending across the material so that alternate sets of slits extend across the troughs and the other alternate sets of slits extend across the crests thereby forming corresponding sets of longitudinally extending bending axes along the crests and troughs respectively; means deflecting the material along one set of longitudinally extending bending axes relative to the material along the other set of longitudinally extending bending axes so that the material assumes a transversely sinuous form; and means progressively squeezing the material in a lateral direction to complete an acocrdion folding thereof.

References Cited by the Examiner

UNITED STATES PATENTS

| | | |
|---|---|---|
| 1,389,294 | 8/21 | Dean. |
| 1,860,820 | 5/32 | Scott _____ 153—2 |
| 2,747,064 | 5/56 | Van Pappelendam. |
| 2,933,122 | 4/60 | Christman _____ 153—2 |
| 2,983,302 | 5/61 | Robinson _____ 153—76 |
| 3,003,540 | 10/61 | Robinson _____ 153—76 |

FOREIGN PATENTS 189,297  11/22  Great Britain.

WHITMORE A. WILTZ, *Primary Examiner.*